United States Patent [19]

Beyer et al.

[11] 4,244,081
[45] Jan. 13, 1981

[54] HINGE FOR SPECTACLES

[75] Inventors: Karl Beyer, Meyrin-Geneva; Conrad Zellweger, Chene-Bougeries-Geneva, both of Switzerland

[73] Assignee: La National S.A., Geneva, Switzerland

[21] Appl. No.: 43,888

[22] Filed: May 30, 1979

[30] Foreign Application Priority Data

May 30, 1978 [CH] Switzerland ............... 5872/78

[51] Int. Cl.³ ............................................. G02C 5/16
[52] U.S. Cl. .................................. 16/128 A; 403/328; 351/113
[58] Field of Search ................... 16/128 A; 351/113; 403/328

[56] References Cited

U.S. PATENT DOCUMENTS

| 1,572,142 | 2/1926 | Hood | 403/328 X |
| 2,162,359 | 6/1939 | Rhinerault | 403/328 |
| 2,874,609 | 2/1959 | Ducati | 351/113 |
| 3,064,530 | 11/1962 | Vigano | 351/113 X |
| 3,644,023 | 2/1972 | Villani | 16/128 A X |
| 3,837,735 | 9/1974 | Guillet | 16/128 A X |
| 3,957,360 | 5/1976 | Villani | 351/113 |

Primary Examiner—Andrew V. Kundrat
Attorney, Agent, or Firm—Emory L. Groff, Jr.

[57] ABSTRACT

A hinge for spectacles consists of two parts one of which one has a cam surface while the other part comprises a blind cylindrical housing in which are arranged at least one spring and one ball bearing, with the spring pushing the ball bearing against the cam surface. To avoid excessive wear of the cam surface and to facilitate the dismantling of the hinge, the hinge includes an intermediate part located in the housing between the ball bearing and the spring. The intermediate part provides less friction with the ball bearing than the friction between that ball bearing and the cam surface. The housing is provided with devices for retaining its contents which devices reduce the open cross section of the opening of the housing.

3 Claims, 4 Drawing Figures

HINGE FOR SPECTACLES

Spectacle hinges are known which consist of two articulated parts connected to each other, one of which is in the shape of a cam, the other involving a blind cylindrical housing in which are arranged a spring and a ball bearing, with the spring pushing the ball bearing against the cam shape.

When known hinges of this type are dismantled, principally for changing the temples on a pair of spectacles, the ball bearing and the spring may come out of the housing and be lost. Another shortcoming of these hinges is that the ball bearing does not rotate in its housing, as it is blocked by the spring, so that it slides along the cam surface and causes rapid wear thereof.

The object of the invention is to correct these problems and the hinge of the present invention is characterized by a blind cylindrical housing having an open end and a closed end, which has devices for retaining its contents, said retaining devices reducing the open cross section of the housing near its opening.

For the purpose of decreasing the wear of the cam surface, a hinge according to the invention includes an intermediate part placed within the housing between the spring and the ball bearing, said intermediate part giving rise to less friction with the ball bearing than the friction between that ball bearing and the cam surface.

The attached drawing shows, schematically and by way of example, two embodiments for making a hinge which is the subject of this invention.

Figure 1:
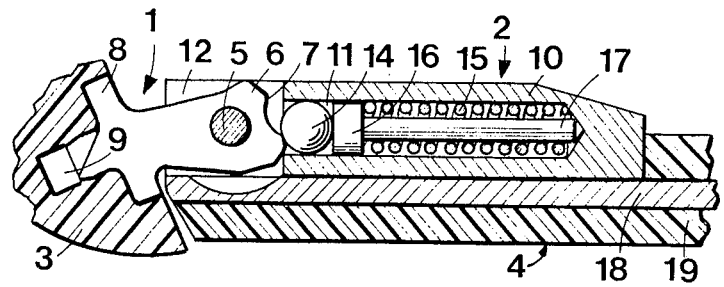
FIG. 1 is a partial cross section of a hinge according to the invention on a plane perpendicular to its axis of articulation.

The hinge shown in FIG. 1 consists of two parts 1 and 2 which are connected to each other at a joint by a screw 5 and attached, respectively, to the rim portion of a frame 3 of a pair of spectacles and to a temple 4.

The first part 1 comprises a section 6 which is cut out in the shape of a cam 7 at one end and at its other end is provided with anchoring devices consisting of two cross members 8 and 9 more or less at right angles to one another which are embedded in the rim portion of the frame 3.

The first part 1 is made from a piece of sheet metal cut out in a manner so that the two cross members 8 and 9 are parallel to each other. The sheet metal is then twisted approximately one quarter turn between the two cross members 8 and 9 so that they are more or less at right angles to each other.

The second part 2 consists of an elongated member 10 with an open end and a closed end providing cylindrical housing 11 and a slot 12 at the open end of the housing 11. This slot is designed to receive section 6 of part 1 which has the cam surface 7 and, as shown in FIG. 3, is provided with aligned threaded holes 13, set perpendicular to the plane of the slot 12, adapted to receive the screw 5 for connecting the parts 1 and 2.

The housing 11 contains a ball bearing 14, a spring 15, an intermediate part 16 and a stop rod 17. The spring 15 is pressed against the end of the housing 11 and, through part 16, pushes the ball bearing 14 against the cam surface 7. The material used to make the intermediate part 16 is such that the friction of the ball bearing 14 on the intermediate part 16 is less than the friction of the ball bearing 14 against the cam surface 7. The intermediate part 16 may, for example, be made of Teflon or of a metal harder than that used to make the first part 1 of the hinge. The intermediate part 16 which is cylindrical in shape, is manufactured integral with the rod 17 and slides in the housing 11. The stop rod 17 is arranged inside the spring 15 and resists the movement of the ball bearing 14 and the intermediate part 16 at the end of its range of free play in the direction of the end of the housing, thereby limiting the opening of the hinge. The second part 2 is made integral with the metallic brace 18 of the temple 4, the brace 18 in question then being embedded in plastic material 19. The brace 18 covers the slot 12, thus hiding the cam shape 17 when the temple 4 is seen from the outside of the pair of spectacles.

Figure 2:
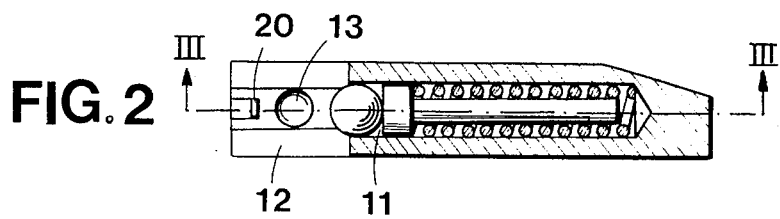
FIG. 2 is a longitudinal cross section of part of a hinge.
Figure 3:
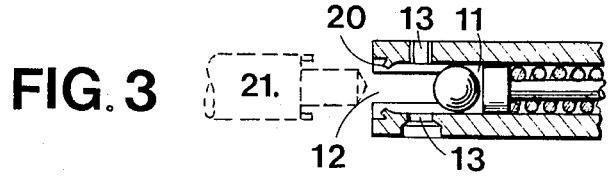
FIG. 3 is a cross section along the line III—III of FIG. 2.

As shown in FIGS. 2 and 3, the second part 2 is equipped with retaining devices in the housing 11. These retaining devices consist of a fin 20 which may, for example, be formed by means of a tool 21 after the spring 15, the rod 17 with the intermediate part 16 and the ball bearing 14 have been put in place in the housing 11, said fin 20 reducing the open cross section of the housing 11 near its opening.

As particularly shown in FIGS. 2 and 3, the part 2 terminates in a slot 12 the width 24 of which is less than the diameter of the housing 11. In effect, slot 12 forms a terminal part of a fork comprising two arms 25 and 26 which provide grooves 27 and 28 of a shape which corresponds to the extensions of the cylindrical surface of housing 11. The openings 13 which receive the screw 5 are formed in the aforementioned arms 25 and 26. The fins 20 are of a height less than the depth of grooves 27 and 28 since the width 24 of slot 12 corresponds substantially to the thickness of the section 6 of part 1 of the hinge.

Numerous modifications of the hinge of the invention may be foreseen. The retaining fin could be replaced by any device which reduces the open cross section of the housing 11 near its opening, for example, a transverse screw or a flange, which could be hemispherical in shape and which may or may not extend along the stop rod 17 could be employed.

Figure 4:
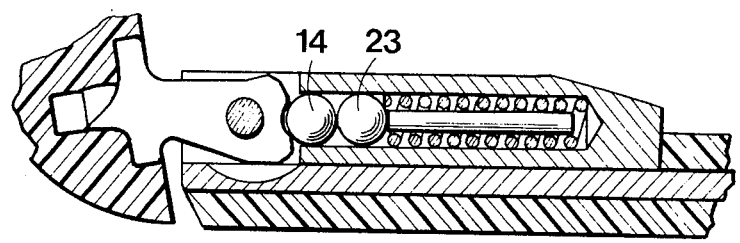
FIG. 4 is a partial cross section of a second embodiment for making the hinge on a plane perpendicular to its axis of articulation.

FIG. 4 shows a modification in which the intermediate part in question consists of a ball bearing 23 identical to the other ball bearing 14, which makes it possible to reduce the number of different parts used in the hinge and thus to lower the manufacturing cost.

The hinge described above is of great value as it enables a manufacturer to provide a user, in particular an optician, with separate temples for spectacles which contain all the parts necessary for operation, without the possibility of lost parts. In addition, as friction of the ball bearing 14 on the intermediate piece 16,23 is less than the friction of the ball bearing 14 on the cam surface 7, the ball bearing 14 rolls against the cam surface 7 thereby preventing excessive wear of the latter. Furthermore, the manufacturing cost of the hinge part attached to the rim portion of the spectacles is less than that of the known corresponding parts, as it is manufactured without stamping and torsion.

We claim:

1. A hinge for spectacles comprising two parts connected to each other, one of said parts being in the shape of a cam, the other of said parts comprising a blind cylindrical housing having an open end, at least one spring and one pressure member in said housing, said pressure member comprising a ball bearing, said spring pushing said ball bearing against said cam shape, an intermediate part mounted within the housing between said ball bearing and said spring, said intermediate part providing less friction with the ball bearing than the friction of said ball bearing on the cam shape, said intermediate part comprising a cylindrically-shaped member sliding within the housing, a rod mounted axially inside said spring, said rod providing a stop which limits the opening of said hinge, said rod and said intermediate part being integral, said cylindrical housing including means for retaining its contents, said retaining means reducing the open cross section of said housing near its opening.

2. A hinge according to claim 1 wherein, said retaining means comprises fins in the internal surface of the housing made after putting the ball bearing and the spring in place in said housing.

3. A hinge according to claim 1 wherein, said intermediate part comprises a ball bearing.

* * * * *